(12) United States Patent
McIntire et al.

(10) Patent No.: US 8,130,680 B1
(45) Date of Patent: Mar. 6, 2012

(54) METHOD FOR TIMING A PULSED COMMUNICATION SYSTEM

(75) Inventors: William K. McIntire, Sandy, UT (US); Larry S. Thomson, Bountiful, UT (US); David H. Robbins, Bountiful, UT (US)

(73) Assignee: L-3 Communications, Corp., New York, NY (US)

( * ) Notice: Subject to any disclaimer, the term of this patent is extended or adjusted under 35 U.S.C. 154(b) by 490 days.

(21) Appl. No.: 12/019,455

(22) Filed: Jan. 24, 2008

(51) Int. Cl.
*H04J 3/00* (2006.01)
*H04J 3/06* (2006.01)
*H04L 5/14* (2006.01)
*H04N 13/04* (2006.01)

(52) U.S. Cl. ........ 370/277; 370/280; 370/294; 370/350; 348/59

(58) Field of Classification Search .................. 370/212, 370/213, 215, 276, 287, 324, 350
See application file for complete search history.

(56) References Cited

U.S. PATENT DOCUMENTS

| | | | |
|---|---|---|---|
| 2,980,903 A | 4/1961 | Hagopian et al. | |
| 3,460,139 A | 8/1969 | Rittenbach | |
| 3,550,124 A | 12/1970 | Heft et al. | |
| 3,946,384 A | 3/1976 | Westaway | |
| 4,458,246 A | 7/1984 | Filipsson et al. | |
| 4,733,238 A | 3/1988 | Fiden | |
| 4,954,829 A | 9/1990 | Fiden | |
| 5,917,430 A | 6/1999 | Greneker, III et al. | |
| 5,924,034 A * | 7/1999 | Dupuy | 455/440 |
| 6,111,536 A * | 8/2000 | Richards et al. | 342/125 |
| 6,285,681 B1 | 9/2001 | Kolze et al. | |
| 6,396,586 B1 | 5/2002 | Wei et al. | |
| 6,404,703 B1 * | 6/2002 | Burrell | 367/128 |
| 6,469,653 B1 | 10/2002 | Haynes | |
| 6,549,567 B1 * | 4/2003 | Fullerton | 375/219 |
| 6,606,033 B1 | 8/2003 | Crocker et al. | |
| 6,616,611 B1 | 9/2003 | Moehring | |
| 7,006,534 B1 * | 2/2006 | Nemoto | 370/508 |
| 7,053,797 B2 | 5/2006 | Taylor | |
| 7,102,536 B2 | 9/2006 | Scholz | |
| 7,113,107 B2 | 9/2006 | Taylor | |
| 7,558,356 B2 * | 7/2009 | Pollman et al. | 375/367 |
| 7,590,198 B2 * | 9/2009 | Sanada et al. | 375/343 |
| 2001/0022558 A1 | 9/2001 | Karr, Jr. et al. | |
| 2003/0003874 A1 | 1/2003 | Nitta et al. | |
| 2003/0156603 A1 | 8/2003 | Rakib et al. | |
| 2004/0085938 A1 | 5/2004 | Tiedemann, Jr. et al. | |
| 2004/0120304 A1 | 6/2004 | Kloos et al. | |
| 2004/0147269 A1 | 7/2004 | Kim | |
| 2004/0190597 A1 | 9/2004 | Cowie et al. | |
| 2004/0202244 A1 * | 10/2004 | Pappalardo et al. | 375/240 |
| 2004/0266457 A1 | 12/2004 | Dupray | |
| 2005/0025101 A1 | 2/2005 | Paneth et al. | |
| 2006/0142913 A1 | 6/2006 | Coffee et al. | |

(Continued)

*Primary Examiner* — Kevin C Harper
*Assistant Examiner* — Samina Choudhry
(74) *Attorney, Agent, or Firm* — Kirton & McConkie; N. Kenneth Burraston (57) ABSTRACT

A method for timing a full duplex pulsed wireless communication system between first and second transceivers is disclosed. At least one of the transceivers is mobile. A propagation time between the first and second transceivers is calculated. A pulse period of the first transceiver is set to be twice the propagation time divided by an integer. The second transceiver's pulse period is set to be equal to the pulse period of the first transceiver to enable the first and second transceivers to transmit and receive pulses with a substantially reduced risk of a collision between pulses transmitted from the first and second transceivers.

22 Claims, 6 Drawing Sheets

U.S. PATENT DOCUMENTS

| | | |
|---|---|---|
| 2006/0183488 A1 | 8/2006 | Billhartz |
| 2006/0203795 A1* | 9/2006 | Welborn et al. ............... 370/345 |
| 2006/0264185 A1 | 11/2006 | Jorgensen |
| 2006/0291537 A1 | 12/2006 | Fullerton et al. |
| 2007/0147436 A1* | 6/2007 | Zumsteg ....................... 370/509 |
| 2007/0223632 A1* | 9/2007 | Boskovic et al. ............. 375/354 |

* cited by examiner

METHOD FOR TIMING A PULSED COMMUNICATION SYSTEM

BACKGROUND

Advancements in broadband wireless communication have changed the way we live. People can now communicate and transfer information using techniques that were thought of only in science fiction literature a half century ago. A wide variety of communication resources are available for consumers, businesses, government, and military. For example, a typical consumer traveling in his car can communicate using his cell phone, listen to music over a virtually uninterrupted digital satellite radio signal while traveling cross country, receive broadband data at his computer over a WiMAX connection, and listen to a local traffic report using a high definition radio receiver.

Unfortunately, each of these means of communication typically requires the use of a separate antenna. It is very possible that a typical car, in the next 10 to 20 years, may include five to ten different antennas. Placement of that number of antennas on a car can be difficult, from both a stylistic and a functional point of view. Not only can the antennas appear unsightly, but they can also cause interference with other antennas, as well as requiring expensive wiring within the automobile between each antenna and its associated receiver.

Placement of antennas on commercial and military mobile platforms can be even more challenging. Even large military ships are often limited in the types of communication they can receive due to a lack of space available for associated antennas. Aircraft can be similarly limited. An aircraft designed to travel at high speeds may not have room for, or tolerance for an antenna designed for communicating high speed data over large distances. To overcome this problem, the military uses specialized ships and aircraft for transmitting and relaying information. While this solution generally works, it can be extremely expensive and can increase risk for soldiers in the battlefield if a specific type of communication signal cannot be transmitted or received due to a lack of specialized antennas.

SUMMARY

A method for timing a full duplex pulsed wireless communication system between first and second transceivers is disclosed. At least one of the transceivers is mobile. A propagation time between the first and second transceivers is calculated. A pulse period of the first transceiver is set to be twice the propagation time divided by an integer. The second transceiver's pulse period is set to be equal to the pulse period of the first transceiver to enable the first and second transceivers to transmit and receive pulses with a substantially reduced risk of a collision between pulses transmitted from the first and second transceivers.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One method for overcoming the electrical, spatial, and/or mechanical limitations inherent in the use of multiple antennas on a single platform is to use an antenna for multiple purposes. For example, an antenna designed for transmitting and receiving radar bursts can also be used to transmit and receive data. While transmitting data using a radar antenna has been previously described, the data transmission typically entailed sending a command comprising few bits. Such a system would not be useful in providing high data rate communication capabilities.

A mobile platform or fixed installation containing a radar system may not have a data communications system, or the existing communication system may be insufficient for the needs of the platform. Adding or upgrading a communication system typically entails adding hardware which incurs cost, adds weight, and involves modification of the platform structure (mounting antennas, for example). These additional requirements could be reduced or eliminated if components of the radar system could be exploited for use in data communications.

For example, an aircraft may be configured with a high performance radar which is capable of collecting synthetic aperture radar (SAR) images. Synthetic aperture radar can provide detailed, high definition images. Without a high bandwidth data link, these images typically cannot be downloaded from the aircraft until the aircraft has landed. The addition of a high-speed data communications link allows the image to be downloaded to a ground or airborne platform, or transmitted to a satellite while the aircraft is still in flight.

A two way data link using a radar system can enable a mobile radar platform to both send and receive data. A two way data link can enable critical data to be transmitted to a mobile platform that otherwise lacks the ability to receive such data. The two way data link using a radar system may also provide a higher data rate link than other communications links on the mobile platform, enabling greater amounts of data to be received than is otherwise possible. Additionally, a two way data link can improve downlink communications from the mobile platform to a receiver by enabling communication between the radar system and the receiver, such as an acknowledgement that data sent by the radar was received by the receiver.

Some radar equipment (due, for example, to thermal constraints) cannot operate continuously, and is only capable of transmitting short bursts. This is true in the case of radars installed on certain aircraft today. The radar bursts, which can be as short as several hundred nanoseconds or as long as several hundred microseconds, can still be used to carry data despite the relatively short period of each burst. Ordinarily, data links configured to transmit large amounts of data use a continuous data signal. Transmitting large amounts of data using a bursted radar signal having short period bursts requires a different solution, since large data files, such as high definition photographs, cannot be transmitted over a single burst.

Figure 1:
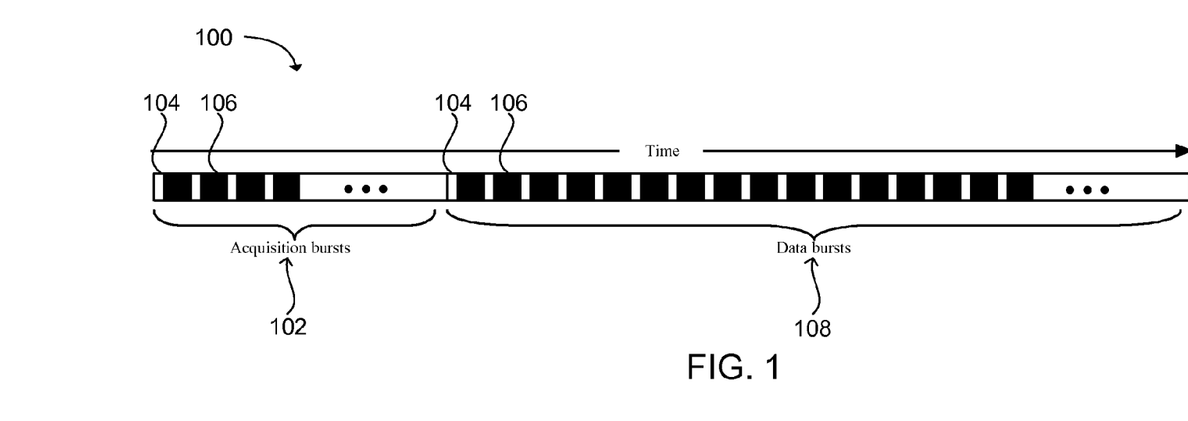
FIG. 1 is a block diagram illustrating a burst radar transmission comprising a continuous communication signal broken into segments in accordance with an embodiment of the present invention.

To transmit the continuous data signal in discrete bursts, the communication signal can be broken into segments. Each segment can be transmitted within the length of the transmit bursts. The maximum length of these bursts will usually be constrained by the radar RF hardware, such as the need for cooling. However, other constraints are also conceivable. Use of a substantially maximum length of each burst to transmit data can be desirable. This burst length, minus any guard intervals allowed at the beginning and end of the burst, can be used to determine the length of the communication signal segments. FIG. 1 shows an example of a burst radar transmission 100 comprising a continuous communication signal broken into segments.

The burst radar transmission 100 can be configured to carry data at high data rates. The transmission can includes a plurality of bursts having a transmit period 104 followed by a blanking period 106 during which the radar equipment can cool. The blanking period can also be used to receive data at the radar. The blanking period can be several times as long as the transmit period. The ratio of the transmit period to the total time between pulses (pulse period) is typically referred to as the duty cycle. In one embodiment, the blanking period can be twice as long as the transmit period for duty cycles of approximately 33%, though a range of ratios are possible, depending on the characteristics of the hardware and data link management issues, as can be appreciated.

The burst radar transmission can include one or more acquisition bursts 102. The acquisition bursts can include training sequences, frame synchronization sequences, and other sequences useful in synchronizing a receiver with the burst transmissions. The acquisition burst(s) can be followed by payload (data) bursts 108, configured to carry data at relatively high rates. This is discussed more fully in the copending U.S. patent application Ser. No. 11/592,536, filed on Nov. 3, 2006 and titled "System and Method for Transmitting High Data Rate Information from a Radar System", which is herein incorporated by reference in its entirety.

Synchronization with Radar Hardware

A modem is typically used to modulate data onto a carrier signal to form a communication signal. It is convenient if the modem is able to control the timing of the transmit periods in the RF hardware. This way, synchronization of the communication signal segments with the radar burst transmit periods 104 can be accomplished. In some cases this is not possible. Certain modern radar systems in use today present just such a case, wherein the radar cannot accept control of the transmit periods from an external source. In this case, the radar hardware can provide some sort of gate signal so that the modem can know the timing of the transmit burst periods. The radar hardware may also provide a reference clock signal to which the gate signal is synchronized. Communication methods in systems wherein the radar cannot accept control of the transmit periods from an external source can use a method referred to as macro-time-division-duplex (macro-TDD).

Figure 2A:
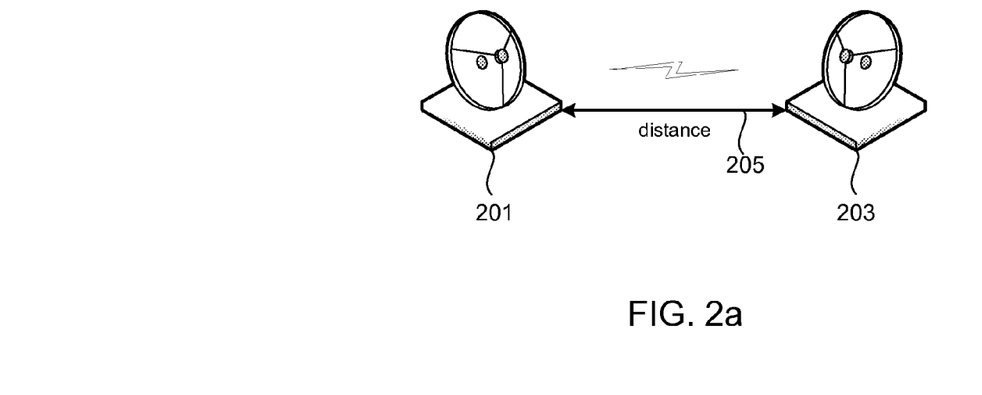
FIG. 2a is an illustration of two communications terminals separated by a distance in accordance with an embodiment of the present invention.

In other types of modern radar systems in use today, the radar can accept control of the transmit periods from an external source. In such systems, a communications method referred to as micro-time-division-duplex (μTDD) can be used to maximize the amount of data that can be communicated between pulsed communication terminals where at least one of the terminals cannot transmit and receive continuously. For example, FIG. 2a illustrates a first terminal 201 in wireless communication with a second terminal 203. One or both of the terminals may be built around a pulsed wireless communication system such as a radar system. Full duplex communications between the two radar systems can be accomplished by breaking the data to be transmitted into short bursts that are approximately equal in length to the radar pulse. The pulse is then modulated with the data, as previously discussed. Data can be received at each terminal during the blanking period 106 (FIG. 1) between the radar pulses. The terminals shown in FIG. 2a are for illustration purposes only and should not be construed as limiting in any way. The terminals shown are used to illustrate any type of wireless system wherein at least one of the terminals uses a pulsed communication system to transmit information. At least one of the terminals can be a mobile terminal, such as a terminal mounted on a ground, water, air, or space based vehicle.

Typically, the data transmitted from one communication terminal using pulsed communications may or may not be received at the other terminal, depending on where the other terminal is in its pulsed transmit/receive cycle. A distance 205 between the two terminals 201, 203 determines how much propagation time occurs from transmission of the data at one terminal to reception of the data at the other terminal. As the distance between the terminals changes, the propagation time changes. The result may be a burst from one terminal arriving at the other terminal while the terminal is transmitting. When a transmit pulse from a first terminal arrives at the second terminal during the second terminal's transmit interval the result is referred to as a collision. Since radar systems commonly have a fixed pulse repetition rate, it may not be possible to guarantee that no collisions occur. Specifically, as the distance between the terminals changes it is not possible to guarantee in a system using a fixed pulse repetition rate that each transmitted pulse will arrive at the second terminal during the second terminal's blanking period or receive cycle.

To enable full duplex communication between wireless pulsed communication systems, μTDD can be used to substantially eliminate the possibility of data collisions between pulsed communications terminals. One feature of μTDD that allows data to be sent without collisions is the ability to alter the pulse period of both terminals. The pulse period is defined as the time between the beginning of one pulse until the beginning of the next pulse. Alternatively, the pulse period can be measured at any point through the pulse and blanking period cycle.

It has been discovered that when the pulse period of both terminals are adjusted to be twice the propagation time divided by an integer that communication can occur between the terminals without collisions. This can be summarized in the equation:

$$P = \frac{2t_p}{N}, \qquad (1)$$

where P is the pulse period in seconds, $t_p$ is the propagation time between the first and second terminals in seconds, and N is a positive integer greater than zero.

The propagation time between the pulsed communications terminals can be calculated by determining the distance between the terminals using a variety of methods. For example, each of the pulsed communications terminals can have a global positioning satellite (GPS) receiver that can be used to determine each terminals relative location. The distance between the terminals can be quickly calculated using the location information from the GPS receivers.

In another embodiment, a pseudo-random bit sequence (PRBS) can be transmitted between the pulsed communications terminals. In one embodiment, the elements of the PRBS can be configured as range bits that can be included in each transmit burst along with the sync and user data symbols. The receiving terminal can be synchronized to the PRBS and configured to transmit the range bits back to the originating terminal. The originating terminal can use the range bits to determine the number of pulse periods in the total propagation time. Knowledge of the number of pulse periods can be used to determine a course range measurement. Counting the symbol periods from the start of any transmit burst until the next received burst can provide fine range measurement to within one symbol of accuracy.

Once the distance between the pulsed communications terminals is known, the propagation time can be determined using the equation:

$$t_p = \frac{d}{c} \qquad (2)$$

where $t_p$ is the propagation time, d is the distance between the terminals, and c is the speed of light in the medium through which the signals are traveling.

The integer N in equation (1) can be selected to limit the pulse width of the transmit pulse to be within a reasonable time period for the radar transmitter such that physical constraints such as thermal and power supply problems are avoided. The propagation time may change significantly if the distance between the terminals is changing relatively quickly, such as when one or both of the terminals are mounted on an aircraft. The system can change the pulse period in response to the change in propagation time.

It has been discovered that communication between terminals can be successful even with a rapid change in distance between the terminals. For example, with a relative velocity between the terminals on the order of 1000 nautical miles per hour, substantially collision free communication can be maintained by updating the pulse period at each of the terminals based on the changing propagation time at a rate of approximately once per second. With lower relative velocities between the terminals, the pulse period can be updated less frequently.

To avoid communication errors, the transmitter and receiver at the respective pulsed communications terminals can change the pulse period synchronously though offset by the propagation time. In one embodiment, this can be accomplished using the range bit transmitted in each pulse. The range bit can be used to derive an epoch signal. For example, the sequence can be an m-ary type PRBS sequence such as a PRBS sequence having a length of $2^7-1$. If the PRBS sequence is generated with a shift register, the epoch can be defined to occur when the shift register outputs all "ones". Any method used to determine an epoch in the PRBS sequence is considered within the scope of this application.

The PRBS sequence can be transmitted by a first terminal and received at the second terminal offset by the propagation time. The receiver can track the transmitter range bit and use a corresponding shift register that can provide a synchronous epoch signal to the transmitter that is offset by the propagation time. When the pulse period is changed by the transmitter, the transmitter can set some control bits in the transmit frame at a start of the epoch. The receiver can integrate the control bits using a soft accumulate method or other forward error correction methods, and develop very high confidence as to the new pulse period over the epoch interval. The transmitter and receiver can then change pulse periods on the next epoch. This allows data to be continuously sent between the first and second terminals even as the pulse period of the transmitter and receiver are changed.

Figure 2B:
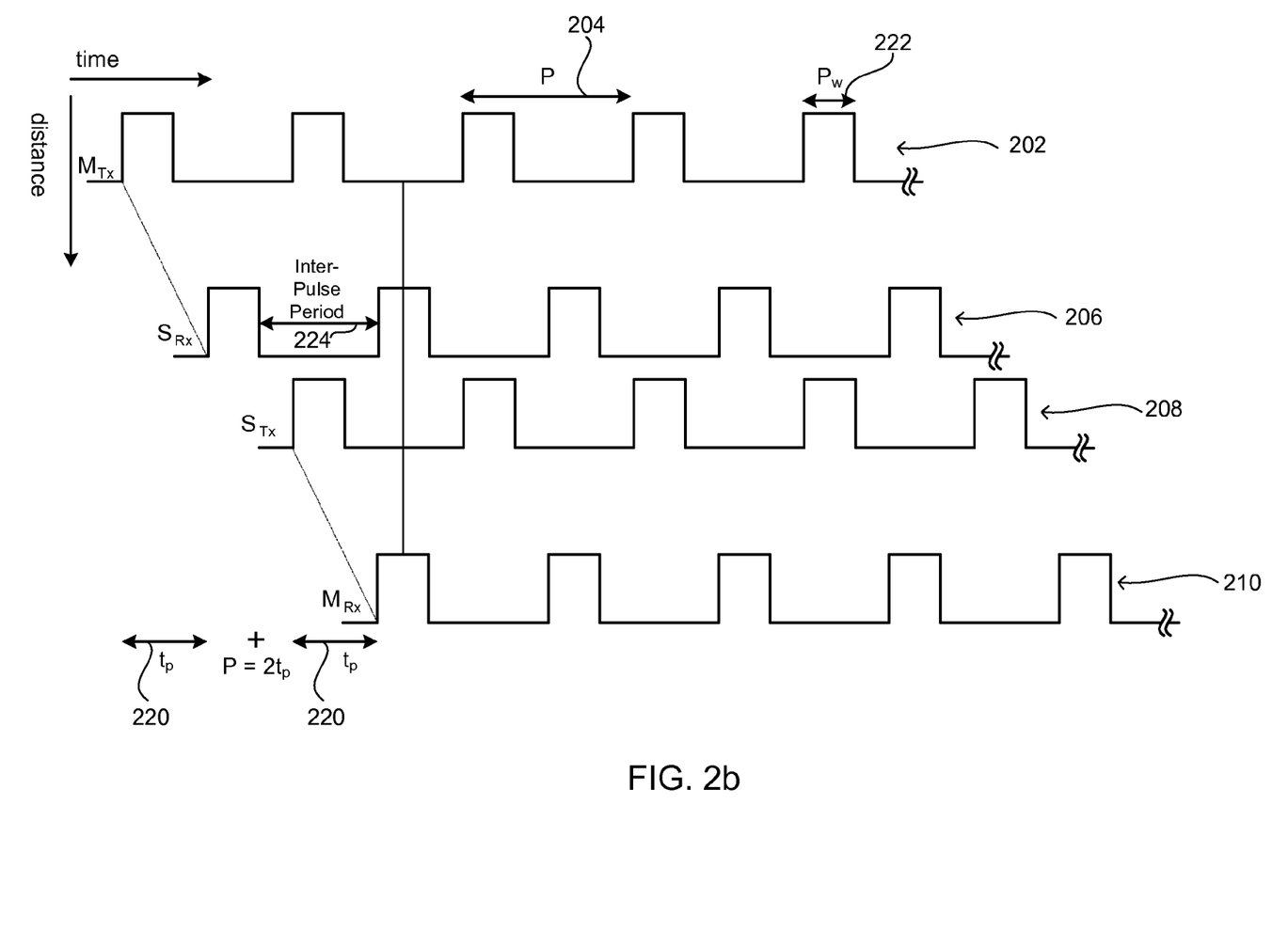
FIG. 2b is a timing diagram illustrating how pulsed signals can be transmitted and received between two terminals separated by a distance in accordance with an embodiment of the present invention.

FIG. 2b illustrates one exemplary embodiment of the invention. A first terminal, referred to as the master terminal, can transmit a pulsed wireless signal 202 to a second terminal referred to as the slave terminal. The terminal designated as the master terminal can be the first terminal to transmit a communication. The terminal designated as the slave terminal can be the first terminal to receive a communication from the master terminal. Thus, the terms may be used interchangeably between two terminals, depending on which terminal is the first to transmit and which terminal is the first to receive.

The pulsed wireless signal illustrated in FIG. 2b can have a known duty cycle and a default pulse period 204. The duty cycle is the ratio of the time the pulse is on relative to the total pulse period. In this example the duty cycle is set at approximately 30%. So the pulse may be on for 30 microseconds and off for 70 microseconds for an overall pulse period of 100 microseconds. Any duty cycle may be used for μTDD communication between pulsed communications terminals as long as the total combined duty cycles for the master and slave terminals do not add to be more than 100%. In one embodiment, the combined duty cycles of the terminals can be less than 95% to allow for a 2.5% guard period between transmitted and received pulses.

The transmitted master terminal signal 202 can arrive 206 at the slave terminal after traveling an amount of time equal to the propagation time 220 and can be received at the slave terminal, assuming that the slave terminal is not being used to transmit data or radar pulses. The propagation time is proportional to the distance over which the signal travels between the master and slave terminals. The distance between the master and slave terminals may not be known prior to transmission of the first signal. Thus, collisions may occur if the slave terminal responds to the master terminal with a pulsed response signal that is transmitted back to the master terminal. The pulsed response signal from the slave terminal may collide with pulses being transmitted at the master terminal.

Various methods can be used to overcome the initial transmission and reception problem. For example, in one embodiment, a method for asynchronous transmission of communication data between periodically blanked terminals separated by an unknown distance can be used. The first periodically blanked communications terminal, referred to as Terminal A, can receive a bursted communication from a second periodically blanked communications terminal, referred to as Terminal B. The terminal that first transmits bursted data in a communication between two terminals can be designated the master terminal and the terminal that first receives bursted data can be designated the slave terminal. Using this terminology, Terminal B can be designated the master terminal. In one embodiment, the master terminal can be configured to transmit bursts with a known duty cycle and burst cycle period. In another embodiment, the duty cycle and burst cycle period of the master terminal signal can be measured at the slave terminal. Terminal A can be configured to be the slave terminal and can be set in a receive mode, wherein it does not transmit any bursts.

When Terminal A receives a burst communication from Terminal B, a response signal sent from Terminal A to Terminal B can be guaranteed to not collide with bursts from Terminal B if Terminal A transmits pairs of bursts and the burst cycle period of Terminal A is set to be less than or equal to half the burst cycle period of terminal B while the burst length for Terminal A $t_A$ is limited to:

$$t_A \leq \frac{T}{2} - t_B, \quad (3)$$

wherein T is the burst cycle period of Terminal B, and $t_B$ is the burst length of Terminal B.

Each pair of bursts can be configured to transmit an identical data payload. This payload can include a PRBS range bit. At least one of the bursts in the pair of bursts can be received at the first terminal. The first terminal can then use the received range bits to determine the propagation time between the terminals. This method is more fully described in copending U.S. patent application Ser. No. 12/019,471, filed on Jan. 24, 2008, and titled "Method for Asynchronous Transmission of Communication Data between Periodically Blanked Terminals."

In another embodiment, the initial pulsed transmission can be sent from the master terminal to the slave terminal. The slave terminal can receive the signal and start transmitting back to the master terminal with the phase of the return pulse offset from center. The slave terminal can first attempt to offset early for a predetermined amount of time. If no response is received, the slave terminal can attempt to offset late. Offsetting the signal both early and late can ensure that the link between the terminals can be closed in both directions. Once the link closes, the distance can be computed and the master terminal can command a change to the calculated pulse period. At this point, acquisition is complete and modems within the terminals can switch to tracking mode, as can be appreciated.

In yet another embodiment, asynchronous communication can be instigated between two periodically blanked terminals that are separated an unknown distance by varying the pulse period of the response signal randomly until a period is found that does not have collisions. For example, in one embodiment the master and slave terminals can be set at a default pulse period that is known at both terminals. The master terminal can begin transmitting to the slave terminal using the default pulse period. If the master terminal does not receive a response from the slave terminal, the master terminal can command the slave terminal to transmit pulsed response signal with a new pulse period that was pseudo-randomly chosen. If the master terminal still does not receive a response from the slave terminal, the master terminal can command the slave to transmit a response signal with a different pulse period. Eventually, a pulse period can be selected where there are no collisions that occur between the response signal and the master terminal signal. The master terminal can then receive the response signal from the slave terminal and acquisition can be completed, as can be appreciated. In practice, it typically takes one to four random attempts to find a working pulse period that will enable the response signal from the slave terminal to be received at the master terminal while the master terminal is transmitting.

Once acquisition has been completed, the slave terminal can then transmit a slave transmit signal 208 ($S_{Tx}$) back to the master terminal where it can be received 210 at the master terminal. The slave transmit signal 208 timing can be offset from the slave receive signal 206 timing to enable the transmit pulses to be approximately centered in the inter-pulse period 224 between the receive pulses. However, the transmit pulses do not have to be centered. The separation between the transmit and receive signals only needs to provide a sufficient guard band to enable the transmitter to be turned off and the transmitter to be turned on between the transmit and receive periods. This guard period may be as short as a few nanoseconds.

FIG. 2b illustrates that when the pulse period 204 is set to be equal to twice the propagation time 220, the transmit pulses from each pulsed communications terminal can be received by the other communications terminal so long as the duty cycles of the two terminals add to be less than 100% of the pulse period. In one embodiment, both terminals can have duty cycles of less than 50%, as illustrated in FIG. 2b, wherein the master and slave terminals each have duty cycles of approximately 30%.

Figure 2C:
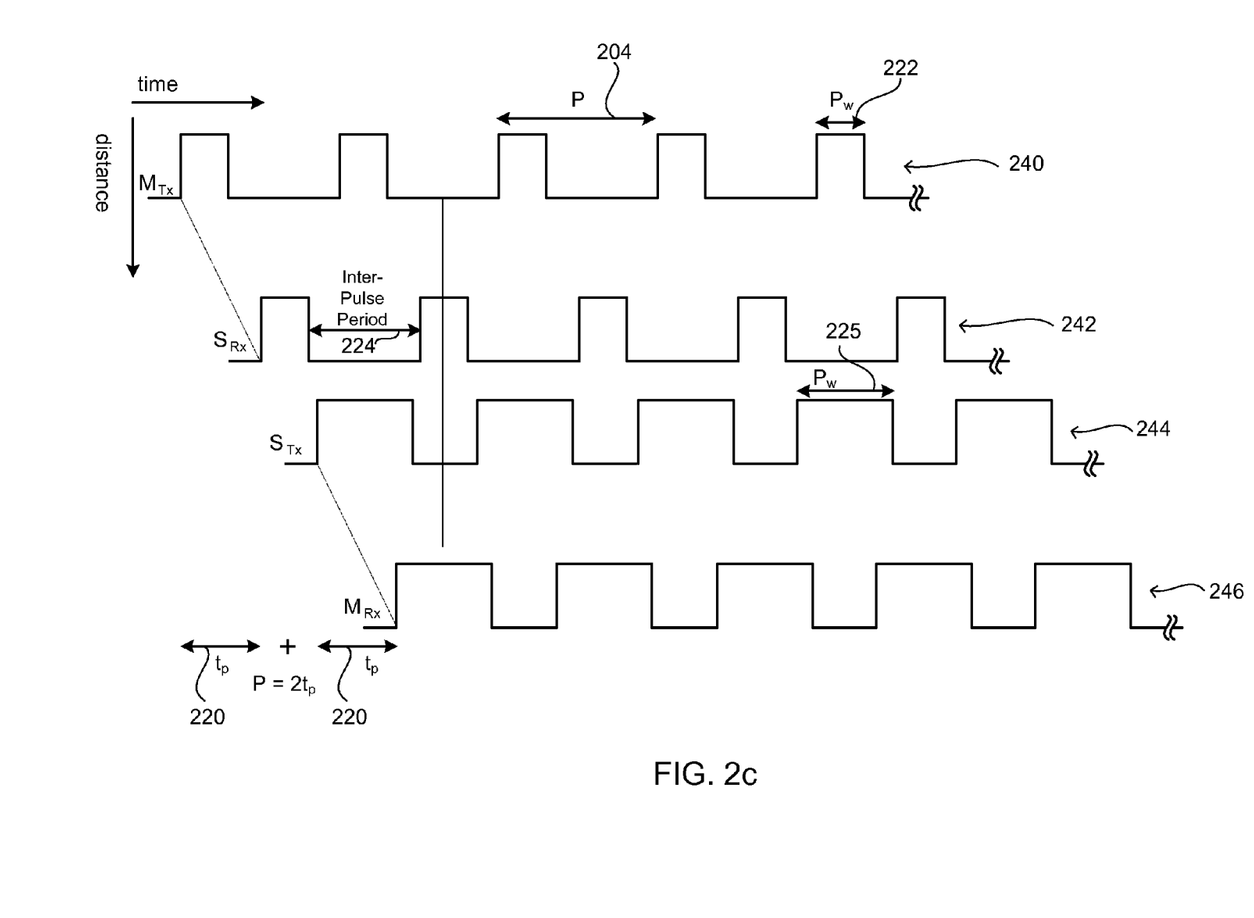
FIG. 2c is a timing diagram illustrating how pulsed signals having different duty cycles can be transmitted and received between two terminals separated by a distance in accordance with an embodiment of the present invention.

In another embodiment, one of the terminals can have a duty cycle of greater than 50%. For example, an aircraft may have a radar system that is limited to a duty cycle of 30%. However, the aircraft may be communicating with a ground station that is capable of transmitting with a duty cycle of 60%. FIG. 2c illustrates a master terminal configured to transmit a pulsed signal 240 with a duty cycle of approximately 30%. The signal is received 242 by a slave terminal, which can be configured to have a substantially similar pulse period 204 as the master terminal, as previously discussed. The slave terminal, which may be a ground terminal capable of generating pulses with a relatively high duty cycle, can be configured to transmit a pulsed signal 244 having a 60% duty cycle over the pulse period. Thus, the slave terminal pulse width 225 can be approximately twice as long as the master terminal pulse width 222, enabling approximately twice as much data to be transmitted in the downlink (slave to the master) as in the uplink (master to slave) in this example. The slave transmit signal can travel back to the master terminal for a period equal to the propagation time 220 and be received 246 at the master terminal.

Figure 2D:
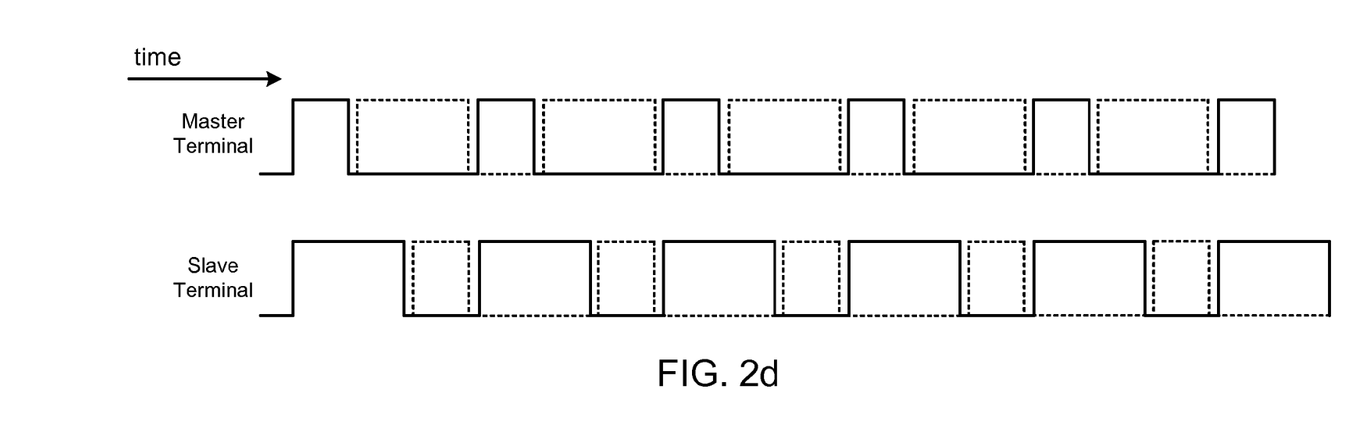
FIG. 2d is a timing diagram illustrating the transmit and receive pulses of two terminals in accordance with an embodiment of the present invention.

Setting the pulse period to be equal to twice the propagation time divided by an integer enables the pulses transmitted by each of the master terminal and slave terminal to be received by the other during its inter-pulse period 224 with little to no chance of a collision occurring between the transmitted and received pulses. A diagram illustrating the transmitted and received pulses is shown in FIG. 2d. Transmitted pulses are illustrated as solid lines and received pulses are illustrated as dashed lines. The master terminal is shown transmitting pulses with a 30% duty cycle and receiving pulses set at a 60% duty cycle. Conversely, the slave terminal is illustrated transmitting pulses at a 60% duty cycle and receiving pulses set at a 30% duty cycle from the master terminal. As previously discussed, the two terminals can effectively communicate without collisions so long as both terminals are set to approximately the same pulse period and the duty cycles of the two terminals add to less than 100%, leaving a guard band between the transmit and receive pulses.

The examples illustrated in FIG. 2d are shown with the value of N in equation (1) set to one. The value of N can be set to any positive integer value that will enable the pulse width output from the transmitters in the master and slave terminals to be constrained within their respective thermal and power limitations. For example, if the two terminals are located 30 km apart, the propagation time according to equation (2) is approximately 100 microseconds. Using equation (1), the pulse period for each of the terminals can be set to be equal to 200 microseconds. If a 30% duty cycle is desired for the master terminal, the pulse width is 60 microseconds. However, the master terminal may include a high power radar transmitter that is limited to transmitting a pulse having a width of 20 microseconds. Therefore, the value of N can be set to be equal to 3 to allow the radar transmitter to transmit within its limitations. As the terminals move closer together the value of N can be reduced to maximize pulse width, and therefore the amount of data that can be transmitted on each pulse.

Figure 2E:
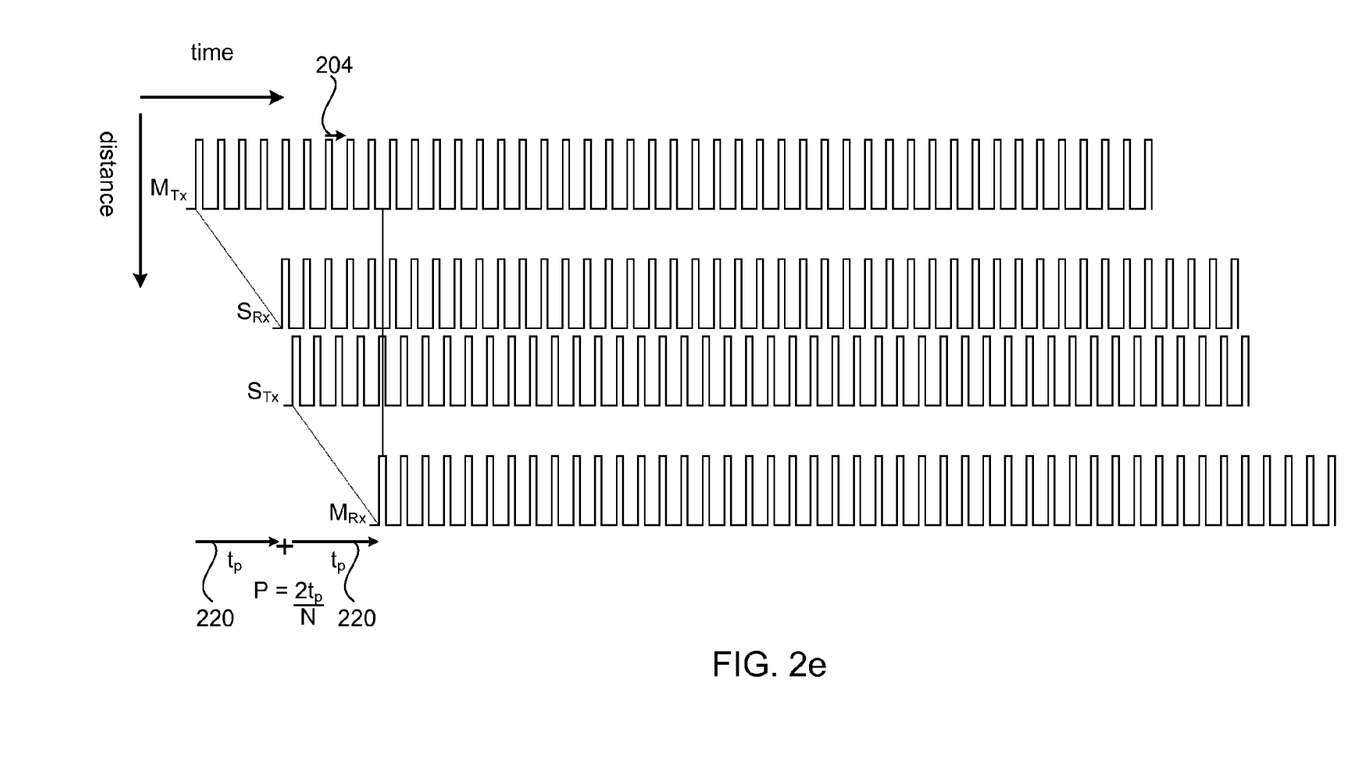
FIG. 2e is a timing diagram illustrating how pulsed signals transmitted and received between two pulsed communications terminals can have a pulse period selected that is twice the propagation time divided by an integer in accordance with an embodiment of the present invention.

In another exemplary embodiment, the pulse period 204 is set with N equal to a value greater than one in equation 1. For example, FIG. 2e illustrates a transmit and receive timing diagram where a ratio value of 8 is selected for N (equation 1). Thus, the total pulse period 204 for the transmit and receive communications terminals is ¼ the propagation time 220. As can be seen, the master transmit pulses $M_{Tx}$ leave the master terminal and are received $S_{Rx}$ by the slave terminal after a propagation time 220. The slave terminal can then transmit pulses $S_{Tx}$ that are then received $M_{Rx}$ by the master communications terminal after a propagation time 220. With N set to a relatively large value, as illustrated in FIG. 2e, a greater number of pulses are transmitted during the propagation time when the signals are in transit between the terminals. However, data modulated on the pulses can still be effectively transmitted and received between the two pulsed communications terminals as previously discussed. Additionally, the ratio value (N) can be dynamically reduced or increased based on the needs of the pulsed transceivers without interrupting communications.

Equations (1) and (2) can theoretically be used to enable pulsed communications terminals to communicate at any distance or velocity relative to the each other. However, in practice the value of N will have to change quickly at high velocities and short distances. When N is changed, a pulse collision may occur for twice the propagation period. For example, at relative velocities of 1000 knots (terminals mounted on two aircraft heading straight toward each other) at a distance of 10 miles or more, N will need to change approximately once every 10 seconds, depending on the radar limits for the pulse period. At longer distances or lower velocities, N will change much less often.

Figure 3:
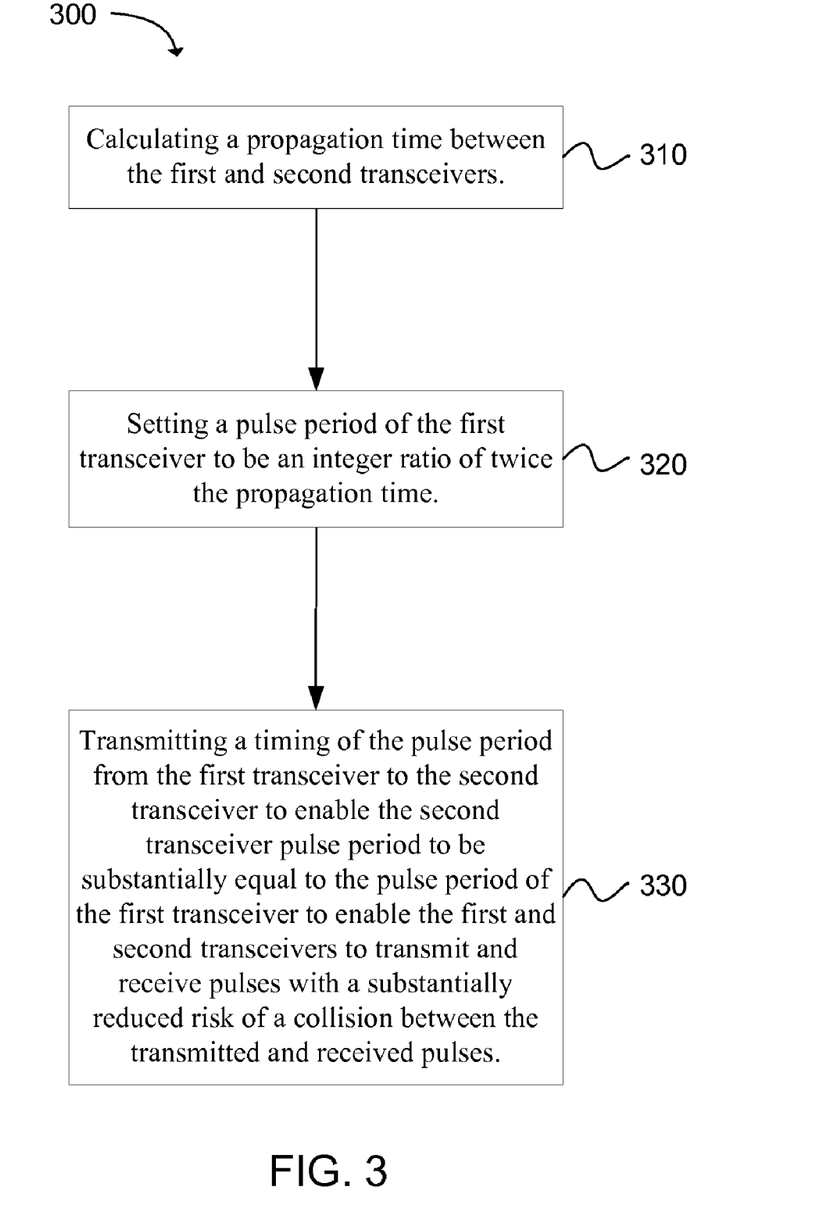
FIG. 3 is a flow chart depicting a method for timing a full duplex pulsed wireless communication system between a first transceiver and a second transceiver in accordance with an embodiment of the present invention.

Another embodiment provides a method 300 for timing a full duplex pulsed wireless communication system between a first transceiver and a second transceiver, wherein at least one of the first and second transceivers are mobile, as illustrated in FIG. 3. The method includes the operation 310 of calculating a propagation time between the first and second transceivers. The propagation time can be determined using extrinsic devices such as GPS systems located on the transceivers. Alternatively, the propagation time can be determined using signal timing methods, as previously discussed.

The method 300 includes the additional operation 320 of setting a pulse period of the first transceiver to be twice the propagation time divided by an integer. A further operation 330 provides transmitting a timing of the pulse period from the first transceiver to the second transceiver to enable the second transceiver pulse period to be substantially equal to the pulse period of the first transceiver. Setting the pulse periods of the first and second transceivers to be equal enables the transceivers to transmit and receive pulses with a substantially reduced risk of a collision between pulses.

The use of μTDD communication can enable pulsed communications terminals to transmit at maximum duty cycles with no data collisions. Additionally, no burst repetition is necessary due to the ability to guarantee substantially collision free full duplex pulsed communication between the terminals. Consequently, the amount of energy used to communicate each bit is minimized between the terminals.

Additionally, μTDD enables standard frequency bin searching to be used to compensate for Doppler shifts in the signals transmitted between the terminals. Typical TDD systems incur latency because data cannot be transmitted and/or received during the receive/transmit interval and must be stored in a memory. The amount of time it must be stored is equal to the receive/transmit interval. Since the receive/transmit interval is very short with the system disclosed in the present application, on the order of 100 microseconds or less, the latency due to the use of TDD is also very short and is often insignificant compared to the propagation time.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for timing a full duplex pulsed wireless communication system between a first transceiver and a second transceiver, wherein at least one of the first and second transceivers are mobile, comprising:

calculating a propagation time between the first and second transceivers, wherein the first transceiver transmits first pulses separated by first blanking periods in which the first transmitter does not transmit and that are interleaved between each of the first pulses, and wherein the second transceiver transmits second pulses separated by second blanking periods in which the second transmitter does not transmit and that are interleaved between each of the second pulses;

setting a first pulse period of the first transceiver to be twice the propagation time divided by an integer, wherein the first pulse period is a time between a start of one of the first pulses and a start of a next one of the first pulses and the integer is a positive number greater than zero; and transmitting a timing of the first pulse period from the first transceiver to the second transceiver to enable setting a second pulse period of the second transceiver to be substantially equal to the first pulse period of the first transceiver to enable the first and second transceivers to transmit and receive pulses with a reduced risk of a collision between a plurality of the first pulses transmitted from the first transceiver to the second transceiver and a plurality of the second pulses transmitted from the second transceiver to the first transceiver, wherein the second pulse period is a time between a start of one of the second pulses and a start of one of a next one of the second pulses.

2. A method as in claim 1, wherein calculating a propagation time further comprises determining a distance between the first and second transceivers.

3. A method as in claim 2, wherein calculating a propagation time between the first and second transceivers further comprises calculating the propagation time by transmitting a pseudo-random bit sequence between the first and second transceivers.

4. A method as in claim 3, wherein transmitting the pseudo-random bit sequence further comprises transmitting a pseudo-random bit sequence comprised of a plurality of range bits, with one range bit transmitted in substantially each transmit burst that is transmitted between the first and second transceivers.

5. A method as in claim 4, wherein transmitting the range bit further comprises transmitting the range bit from the first transceiver to be received at the second transceiver and re-transmitted by the second transceiver back to the first transceiver, wherein a duration between the transmission of the range bit by the first transceiver and the reception of the range bit by the first transceiver is used to calculate one of the distance and the propagation time.

6. A method as in claim 1, further comprising calculating the propagation time based on a knowledge of a location of each of the first and second transceivers.

7. A method as in claim 1, further comprising:
modulating first data onto a plurality of the first pulses, and
transmitting the first pulses modulated with the first data from the first transceiver to the second transceiver.

8. A method as in claim 7, further comprising selecting the integer to enable a pulse width of each of the first pulses to be less than or equal to a maximum allowable period based on physical constraints of the first and second transceivers.

9. A method as in claim 1, further comprising updating the first pulse period of the first transceiver as the propagation time between the first and second transceivers changes.

10. A method as in claim 9, further comprising changing the first pulse period and the second pulse period of the first and second transceivers at an epoch signal in a pseudo-random bit sequence transmitted between the first and second transceivers to enable the first and second pulse periods to be changed synchronously between the first and second transceivers with no interruption in communication.

11. A method as in claim 1, further comprising setting duty cycles of the first and second transceivers such that the duty cycle of the first transceiver and the duty cycle of the second transceiver add to be less than 100% of the first pulse period.

12. A method as in claim 1, further comprising receiving a pulsed communication from the first transceiver at the second transceiver and communicating a pulsed response communication transmitted from the second transceiver to the first transceiver, wherein the pulsed response communication is offset from a center of the second pulse period of the second transceiver.

13. A method as in claim 12, further comprising offsetting the pulsed response communication early to attempt to enable the first transceiver to receive the pulsed response communication with no collisions and offsetting the pulsed response communication late if no reply is received at the second transceiver from the first transceiver.

14. A method as in claim 1, further comprising separating transmitted pulses from received pulses at the first and second transceivers by a guard band period having a sufficient length to enable the transceivers to be switched between transmit and receive modes.

15. A method as in claim 1, further comprising:
determining a change in a distance between the first and second transceivers;
calculating a new propagation time between the first and second transceivers based on the change in the distance; and
adjusting the first pulse period of the first transceiver based on the new propagation time.

16. A method as in claim 7, further comprising:
modulating second data onto a plurality of the second pulses, and
transmitting the second pulses modulated with the second data from the second transceiver to the first transceiver.

17. The method of claim 1, wherein:
the first transceiver is a radar transceiver, and
the first pulses are radar pulses.

18. The method of claim 17, wherein:
the second transceiver is a radar transceiver, and
the second pulses are radar pulses.

19. The method of claim 1, wherein:
each of the first pulses are substantially a same duration,
each of the first blanking periods are substantially a same duration,
each of the second pulses are substantially a same duration, and
each of the second blanking periods are substantially a same duration.

20. The method of claim 19, wherein a sum of a duty cycle of the first pulse period and a duty cycle of the second pulse period is less than one-hundred percent.

21. The method of claim 19, wherein:
a duty cycle of the first pulse period is less than fifty percent, and
a duty cycle of the second pulse period is less than fifty percent.

22. The method of claim 19, wherein a duration of each of the first blanking periods is at least two times a duration of each of the first pulses.

* * * * *